United States Patent Office 2,835,425
Patented May 20, 1958

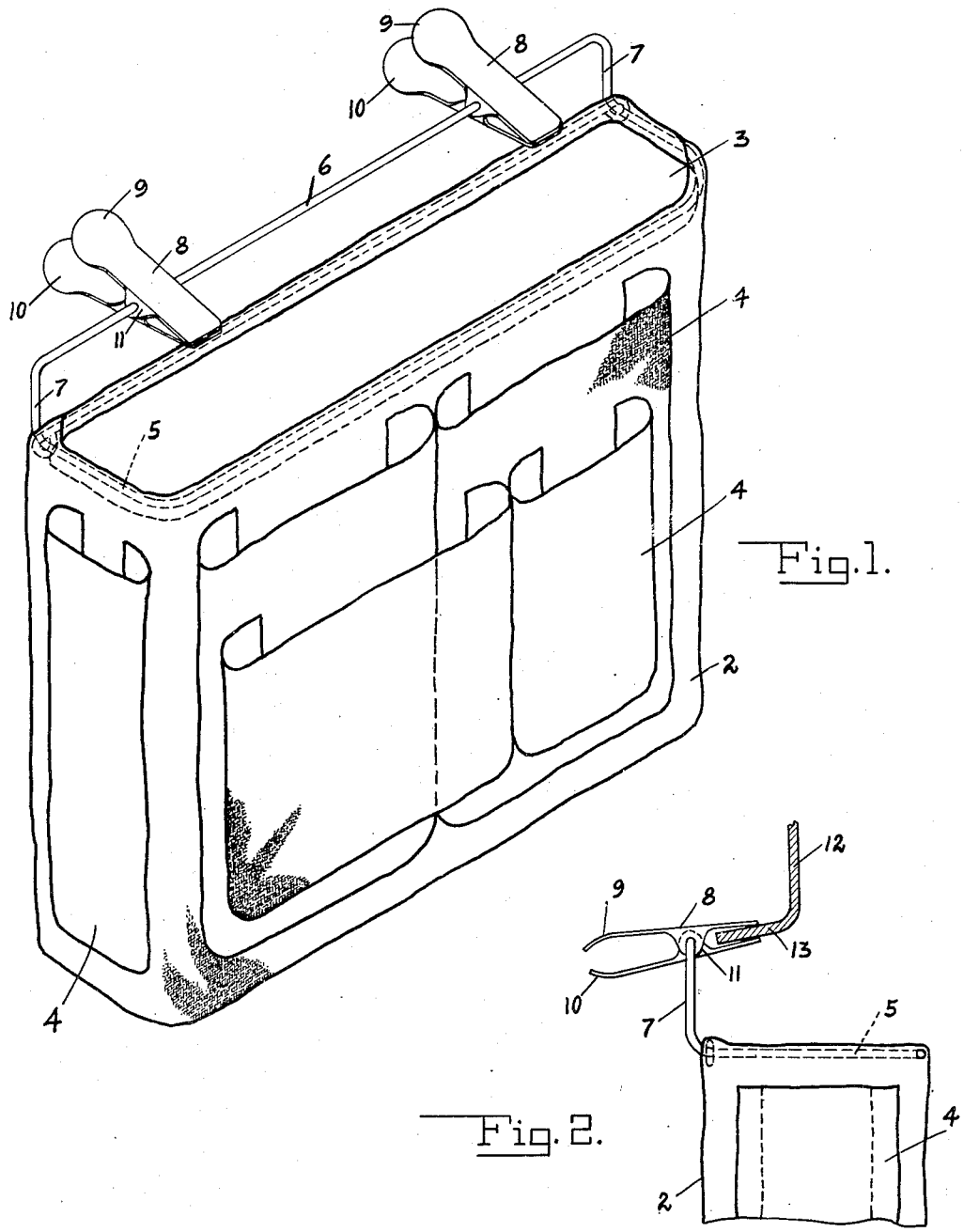

2,835,425
CONVENIENCE CARRIER FOR AUTOMOBILES

Kathryn J. Shultz, Upper St. Clair Township, Allegheny County, Pa.

Application December 2, 1955, Serial No. 550,557

1 Claim. (Cl. 224—42.46)

This invention is for a convenience receptacle for use in automobiles, and more particularly provides a receptacle designed to be detachably suspended from the dash of the automobile and be used as a catch-all for miscellaneous articles which the driver or other occupant of the front seat desires to have readily available.

Many people driving in automobiles, particularly on long trips, are in the habit of keeping miscellaneous articles on the front seat where they will be readily available. These are such articles as cigarettes, candy bars, maps, tissues, maybe binoculars or a camera or flash light, and similar items. While they are convenient when so located on the seat, they also constitute a nuisance in that they continually shift around and get in the way of the driver or the occupant of the other seat. The present invention has for its object to provide a convenience carrier which may be readily attached to the dash of most any standard automobile, and which will hold an assortment of such miscellaneous articles in a place where they will be readily convenient either to the driver or to the other occupant of the front seat.

A further object of the invention is to provide a receptacle of this kind which is readily installed in the automobile, and which may be easily detached without requiring that holes be drilled into the automobile dash, or the interior of the vehicle marred in any way. Being thus readily installed and removed it is possible to place articles in the receptacle before starting on a journey and at the destination to carry the whole receptacle away from the car without bothering to remove the individual items.

A further object of the invention is to provide a receptacle of this kind which is relatively cheap and economical to use.

My invention may be more readily understood by reference to the accompanying drawings, in which:

Fig. 1 is a perspective view of a receptacle embodying my invention; and

Fig. 2 is a fragmentary section showing the manner in which the receptacle is attached to the dash.

In the drawings, 2 designates the receptacle which is preferably made of heavy fabric. It is of generally rectangular contour having a rectangular open top 3, providing access to the main part of the receptacle. Additionally it may be provided with a series of auxiliary pockets 4 on the front and at the end which may be used to receive different specific items, and the number and arrangement of which may be varied as demand may require.

When the receptacle is made of fabric in the manner illustrated, it is provided with a rigid frame at the top to hold the receptacle open and by means of which the receptacle is held in position in the car. As shown in the drawing, a rigid rectangular frame formed of heavy wire is provided, this frame being designated 5. The top of the receptacle is provided with a hem which covers the frame 5, and by means of which the shape of the receptacle is maintained.

At the back of the frame there is a rigid yoke having a cross bar 6 with downwardly-extending leg portions 7 that are rigidly attached to the frame 5 and may be integrally formed therewith.

Slidable along the cross bar 6 of the yoke are two or more spring clips designated generally as 8. These clips are of a usual construction having opposed upper and lower jaws 9 and 10. A spring (not shown) interposed between the jaws 9 and 10 serves to hold the clips normally closed with adequate pressure. The jaws 9 and 10 are provided with integral ears 11 which overlap each other and which have registering holes through which the cross bar 6 of the yoke passes. The yoke thus provides a pivot for the jaws while serving also as a means along which the clips are slidably mounted. Different automobiles have different obstructions at the back of the dash, and by sliding the clamps or clips along the yoke the device may be adapted to almost any popular make and model of automobile.

In using the device, different articles may be loaded into the bag before it is placed in the car, or afterward. The bag is quickly and easily placed in position under the dash and the spread ends of the clips are squeezed to open the gripping portions thereof and engage them with the ledge 13 of the dash. The spring tension between the two elements of the clip not only is fully adequate to firmly support the bag, but creates friction so that once the clips are moved along the cross bar to the required location, they will remain at this location, so that the user need not repeatedly relocate the clips. Also, since the yoke constitutes the pivot for the jaws of the clips, the downward pull of the load in the bag is not effective to open them. The rigid connection between the depending arms of the yoke and the rigid frame holds the frame in a horizontal position with the open top of the receptacle directed towards the occupants of the front seat of the automobile. At destination of the trip, the user may release the carrier and take it with its contents out of the car and is saved the annoyance of gathering up sundry items which may have been placed in the bag. It is therefore much more convenient than the glove compartment and keeps that compartment free for more important things that are often left in the car.

While I have shown and described one embodiment of my invention, it will be understood that various changes and modifications may be made therein within the contemplation of my invention and under the scope of the following claim.

I claim:

A convenience carrier for use in an automobile by suspension from the forwardly-turned ledge at the bottom of the automobile dash comprising a yoke-like frame having a cross bar, a pair of clips on the cross bar having pivoted jaws movable relatively to each other and spring biased to grip an object disposed between the jaws, the cross bar constituting the pivot for the jaws, the clips being slidable along the cross bar and positioned in use in a generally horizontal position to grip the aforesaid ledge of the dash, the yoke-like frame being vertical, said yoke-like frame having rigidly affixed to it a horizontally extending frame which is spaced below the clips and the area defined by the horizontal frame is under the gripping jaws of the clips, so that in the automobile said horizontal frame extends toward the driver's seat, and a flexible bag suspended from said frame.

References Cited in the file of this patent

UNITED STATES PATENTS

| | | |
|---|---|---|
| 666,296 | Wiard | Jan. 22, 1901 |
| 1,201,159 | Dettmer | Oct. 10, 1916 |
| 1,392,716 | Spraggins | Oct. 4, 1921 |
| 2,569,371 | Cohen | Sept. 25, 1951 |
| 2,778,554 | Porkola | Jan. 22, 1957 |